United States Patent [19]

Murakami et al.

[11] Patent Number: 4,462,278

[45] Date of Patent: Jul. 31, 1984

[54] TRANSMISSION FOR VEHICLES

[75] Inventors: Noboru Murakami; Hiromi Hasegawa, both of Nagoya, Japan

[73] Assignee: Aisin Seiki Kabushiki Kaisha, Kariya, Japan

[21] Appl. No.: 264,816

[22] Filed: May 18, 1981

[30] Foreign Application Priority Data

May 19, 1980 [JP] Japan .................................. 55-66190

[51] Int. Cl.³ ............................................. B60K 41/16
[52] U.S. Cl. .................................. 74/868; 74/752 C; 74/867; 74/752 A
[58] Field of Search ............. 74/868, 867, 865, 752 C, 74/752 A

[56] References Cited

U.S. PATENT DOCUMENTS 3,164,034 1/1965 Kelley .
3,738,182 6/1973 Kubo et al. .

FOREIGN PATENT DOCUMENTS 9758 4/1980 European Pat. Off. ............... 74/869
1391633 4/1975 United Kingdom ................... 74/869

Primary Examiner—Allan D. Herrmann
Assistant Examiner—D. Wright
Attorney, Agent, or Firm—Oblon, Fisher, Spivak, McClelland & Maier

[57] ABSTRACT

A transmission for a vehicle, including a torque converter, a planetary gear system capable of forming gear trains of forward low-speed range and high speed range by engagement and release of brakes and a clutch, a manual valve for gear shifting a shift valve, an electromagnetic valve, and a hydraulic control circuit for applying a line pressure to the clutch and brakes. The valves are mounted in a valve casing having a flat wall surface in face-to-face relation with a flat wall surface of a transmission casing. Clamped fluid-tight between the two flat wall surfaces is a partition plate which is provided with apertures for intercommunicating conduits of the hydraulic control circuit formed on the opposite flat wall surfaces of the casings. The present invention employs partition plates with different numbers of communicating holes in different positions. A first partition plate interposed between the valve and transmission casings, provides an automatic transmission in which the planetary gear system is automatically shifted to and from forward low-speed and high-speed range gear trains according to the vehicle speed, with the manual shift valve in forward "D" position. A second partition plate interposed between the casings provides a manual transmission in which the planetary gear system is shifted into a gear train of the forward high-speed range when the manual valve is put in forward "D" position and into a forward low-speed range when the manual valve is put in forward "L" position.

3 Claims, 11 Drawing Figures

TRANSMISSION FOR VEHICLES

BACKGROUND OF THE INVENTION

1. Field of the Invention

The present invention is directed to a transmission for vehicles.

2. Description of the Prior Art

Transmissions for vehicles of the type which are capable of selectively establishing gear ratios for a plural number of forward speeds and one reverse speed by the use of a combination of a torque converter, a planetary gear system and a control mechanism including brakes and clutches are in wide use. Also widely used in such vehicular transmissions is a hydraulic control circuit which distributes operating fluid, of a regulated line pressure from a regulator valve, to the control mechanism by shifting a manual valve to a selected speed range such as forward 1st, forward 2nd, reverse or the like.

With the combination of the control mechanism and the hydraulic control circuit, it is known to provide a D(drive)-range position for the manual valve, controlling the control mechanism to form a gear train of a speed ratio equivalent to that of the low-speed range (e.g., 1st speed) of the manual valve when detected vehicle speed is lower than a predetermined speed and to form a gear train of a speed ratio equivalent to that of the high-speed range (e.g., 2nd speed) of the manual valve when the vehicle speed is higher than the predetermined speed.

SUMMARY OF THE INVENTION

The object of the present invention is to provide a transmission which, for controlling the control mechanism in D-range, employs a shift valve in the hydraulic control circuit, with a spring-biased spool in association with fluid pressures in a pressure chamber (hereinafter referred to as "bottom pressure chamber") which is located on the biased side and in a pressure chamber (hereinafter referred to as "head pressure chamber") which is on the opposite side of the spool to apply a fluid pressure in a direction for compressing the biasing spring, the shift valve having an internal fluid passage which is blocked by the spool when the biasing spring is in stretched state. As the biasing spring is stretched to hold the spool in the first position (when the pressure in the bottom and head pressure chambers are equalized or when the operating fluid is distributed to the bottom pressure chamber alone), the control mechanism changes the planetary gear system into a gear train of a higher reduction ratio (low-speed range). On the other hand, when the biasing spring is compressed to hold the spool in the second position (when the operating fluid is distributed to the head pressure chamber alone), the control mechanism establishes a gear train of a lower reduction ratio (high-speed range) through the planetary gear system.

According to one aspect of the present invention, the transmission is operated manually in response to a manual gear shifting effort on the manual valve which switches the fluid flows to and from the shift valve and hydraulic servo motors of the control mechanism.

According to another aspect of the present invention, the pressure of the operating fluid distributed to the bottom and head pressure chambers of the shift valve is increased or decreased by an electromagnetic valve which operates in response to signals indicative of the vehicle speed, automatically changing the planetary gear system to and from a gear train of high-speed range or of low-speed range while the manual valve is put in D-range position.

More particularly, in a vehicular transmission with such a shift valve incoporated into the hydraulic control circuit along with the manual shift valve, the present invention provides a transmission employing a casing with a flat wall surface which is formed with a conduit of operating fluid of the line pressure received from the regulator valve as well as the main conduits of operating fluid to be supplied to the manual valve, shift valve and hydraulic servo motors of the control mechanism, in combination with a valve casing which movably accomodates the spools of the manual and shift valves in the respective cylinders and provided with valve ports in its flat wall surface in face-to-face relation with the flat wall surface of the transmission casing. The valve casing is clampingly fixed to the transmission casing, interposing between the two flat surfaces a partition plate which is provided with apertures to communicate the fluid conduits on the transmission casing with the valve ports on the valve casing.

According to the present invention, there are provided two kinds of partition plates which are provided with different numbers of apertures in different positions. In a case where the valve and transmission casings are secured to each other through a first partition plate, there is provided a manual transmission which permits gear shifts only by the manual operation of the manual valve. In a case where the second partition plate is interposed between the valve and transmission casings, there is provided an automatic transmission which is, in addition to the gear shifts according to the manual operation of the manual valve, capable of effecting a gear shift automatically when the vehicle speed reaches a predetermined value.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 7 and 8 are diagrammatic views of a hydraulic control circuit constituting a manual transmission according to the invention, of which FIG. 7 illustrates a low-speed range and FIG. 8 a high-speed range; and FIGS. 9 to 11 are diagrammatic views of a hydraulic control circuit constituting an automatic transmission according to the invention, of which FIG. 9 illustrates a low-speed range, FIG. 10 a low-speed range circuit with the manual valve put in high-speed range, and FIG. 11 a high-speed range circuit with the manual valve put in high-speed range.

DETAILED DESCRIPTION OF THE PREFERRED EMBODIMENTS

Figure 1:
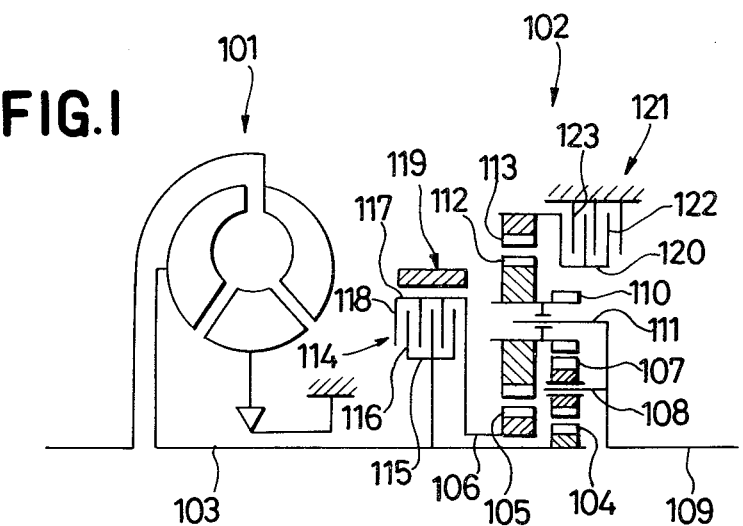
FIG. 1 is a diagrammatic view of a combination of a torque converter and a transmission gear mechanism, which is suitable for application of the present invention.

FIG. 1 diagrammatically illustrates a combination of a torque converter 101 and a transmission gear mechanism 102 in the form of a planetary gear system, to which the present invention is applied. Torque converter 101 includes a pump impeller, a turbine runner, a stator and a oneway clutch, and is coupled with the output shaft of an internal combustion engine (not shown) in the usual manner. The turbine runner is coupled with an input shaft 103 of the transmission gear mechanism 102.

Transmission gear mechanism 102 includes a first sun gear 104 and a second sun gear 105 which are mounted respectively on the input shaft 103 and an intermediate shaft 106. A first pinion gear 107 which is meshed with the first sun gear 104 is rotatably supported on a first carrier 108, which is coupled with an output shaft 109. A second pinion gear 110 which is meshed with the first pinion gear 107 is rotatably supported on a second carrier 111 which is coupled with the output shaft 109. On the other hand, the second sun gear 105 is meshed with a third pinion gear 112 which is supported on the carrier 111 together with the second pinion gear 110. Pinion gear 112 is meshed with a ring gear 113. Input shaft 103, intermediate shaft 106 and output shaft 109 are arranged in coaxial relation with each other.

Provided between the input shaft 103 and intermediate shaft 106 is a clutch 114 with a first hub 115 of a hollow cylindrical shape which is secured to the input shaft 103 concentrically about the rotational axis of the planetary gear system, and a plurality of friction plates 116 which are splined on the outer periphery of the hub 115 movably in the axial direction. On the other hand, a second hub 117 of hollow cylindrical shape which is located concentrically about the rotational axis is connected to the intermediate shaft 106. A plurality of pressure discs 118 are splined on the inner periphery of the hub 117, and are engageable with the friction plates 116 to disconnectibly couple the input shaft 103 with the intermediate shaft 106 when operating fluid pressure is applied to the piston of the clutch 114. The outer periphery of the second hub 117 which is coupled with the intermediate shaft 106 is associated with a first brake 119 so that, upon applying the operating fluid pressure to the brake 119, the intermediate shaft 106 is held on a stationary part, forcibly stopping the second sun gear 105.

A second brake 121 is provided between a third hub 120 which supports the ring gear 113 and a stationary part. A plurality of friction plates 122 which are splined on the outer periphery of the hub 120 are engageable with a plurality of pressure discs 123 which are splined on a stationary part, for releasably locking the ring gear 113 and a stationary part with each other upon applying an operating fluid pressure to the piston of the brake 121.

With the foregoing arrangement, transmission gear mechanism 102 is shifted into one of the ranges of parking (P), reverse (R), neutral (N), high-speed (H) and low-speed (L) by selectively engaging and disengaging the clutch 114, and brakes 119 and 121 as indicated in the following table.

TABLE

| Range | Clutch 114 | Brake 119 | Brake 121 |
| --- | --- | --- | --- |
| P | Released | Released | Released |
| R | Released | Released | Engaged |
| N | Released | Released | Released |
| H | Engaged | Released | Released |
| L | Released | Engaged | Released |

Figure 2:
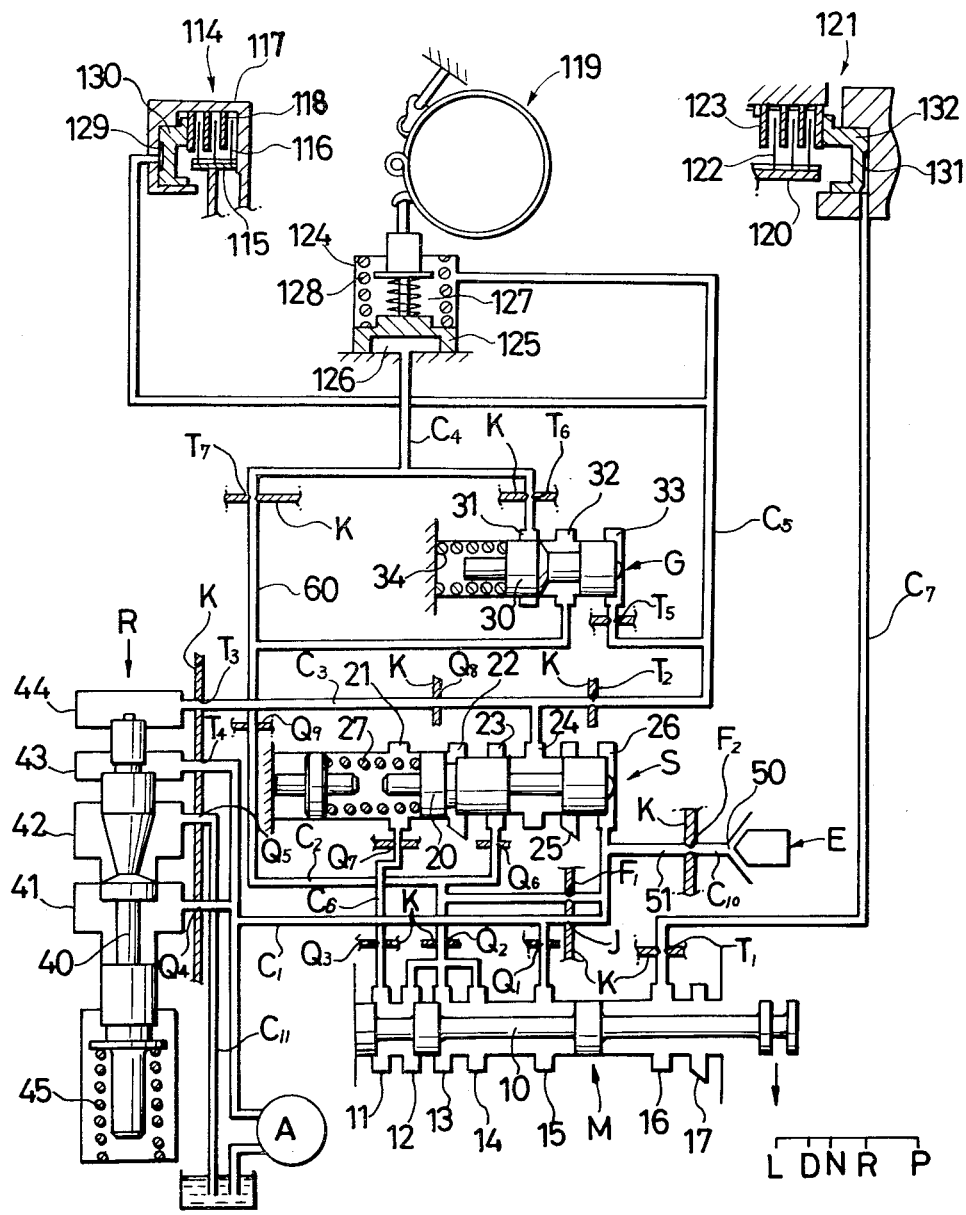
FIG. 2 is a diagram illustrating basic arrangement of a hydraulic control circuit according to the invention.

FIG. 2 illustrates diagrammatically a basic arrangement of a hydraulic control circuit for the control of the clutch 114, first brake 119 and second brake 121, wherein the regulator valve R is provided with a spool 40 which is biased upwardly by a spring 45 within a cylinder which defines four pressure chambers 41 to 44. As the operating fluid pressure which is delivered to the pressure chambers 43 and 41 from the pump A is increased, the spool 40 is pushed downward to return the operating fluid in the pressure chamber 41 to the reservoir, thereby regulating the line pressure in the first conduit $C_1$ in the known manner.

Manual valve M has a spool 10 slidably received in a cylinder which is formed with an inlet port 15, a first outlet port 11, second outlet ports 12, 13, 14, and a third outlet port 16, receiving at the inlet port 15 the operating fluid which is supplied through the conduit $C_1$. The spool 10 is provided with three lands such that, in L-range position, the operating fluid is delivered to the second conduit $C_6$ from the first outlet port 11 and to the third conduit $C_2$ from the second outlet ports 12, 13, 14. In D-range position, the first outlet port 11 is closed and the operating fluid is delivered to the third conduit $C_2$ from the second outlet ports 12, 13, 14. In R-range position, the first and second output ports are closed to deliver the operating fluid from the third outlet port 16.

Shift valve S is provided with a spool 20 within a cylinder which is formed with inlet ports 21, 23 and 26 and an outlet port 24. At one axial end of the spool 20, the cylinder is provided with a bottom pressure chamber which communicates with the second conduit $C_6$ through the inlet port 21. At the opposite end of the cylinder, there is provided a head pressure chamber which communicates with the first conduit $C_1$ through the inlet port 26.

A coil spring 27 which is loaded in the bottom pressure chamber biases the spool 20 in a direction of reducing the volume of the head pressure chamber. Spool 20 is provided with lands such that, in the first position of the spool 20 with the spring 27 in stretched state, the internal fluid passage of the shift valve S connecting the outlet port 24 with the inlet port 23 in communication with the conduit $C_2$ is blocked. In the second position of the spool 20 in which the spring 27 is compressed by the action of the line pressure admitted into the head pressure chamber through the inlet port 26, an internal fluid passage is established between the inlet port 23 and the outlet port 24 to deliver the line pressure in the conduit $C_2$ to the outlet port 24. Spool 20 of the shift valve S is held in the first position when the pressures in the bottom and head pressure chambers are equalized, due to the pressure differential based on the difference between the pressure receiving areas at the opposite ends of the spool 20 and the resilient force of the spring 27 acting on one end of the spool 20. On the other hand, the spool 20 is held in the second position when the line pressure is allowed to prevail only in the head pressure chamber.

Outlet port 24 is communicated with the pressure chamber 44 of the pressure regulator valve R through the conduit $C_3$, the regulator valve R operating in such a manner as to lower the line pressure when the line pressure is discharged out of the outlet port 24.

With regard to the first brake 119, a piston 125 is slidably received in a cylinder 124, dividing the latter into an actuating chamber 126 and a relieving chamber 127. Brake 119 is engaged when the operating fluid pressure is supplied to the actuating chamber 126. A return spring 128 is loaded in the relieving chamber 127 against the piston 125, so that the brake 119 is disengaged by the resilient force of the return spring 128 when the internal pressures in the two chambers 126 and 127 are equalized. Pistons 130 and 132 are provided in the cylinders 129 and 131 of the clutch 114 and the second brake 121 to drive the pressure discs 118 and 123, respectively.

Third conduit $C_2$ communicates with the actuating chamber 126 of the brake 119 through the conduit $C_4$, while the relieving chamber 127 of the brake 119 and the cylinder 129 of the clutch 114 communicate with the outlet port 24 of the shift valve S through the conduit $C_5$. Further, the cylinder 131 of the second brake 121 communicates with the third outlet port 16 of the manual valve M through the conduit $C_7$, thus distributing the operating fluid of line pressure from the first conduit $C_1$.

Electromagnetic valve E operates in response to signals indicative of the vehicle speed to open a drain port 50 when the vehicle speed is lower than a predetermined value and to close same when the vehicle speed is higher than that value. Conduit $C_{10}$ from the drain port 50 communicates with the inlet port 26 of the shift valve S through an orifice $F_2$ and a passage 51.

Figure 3:
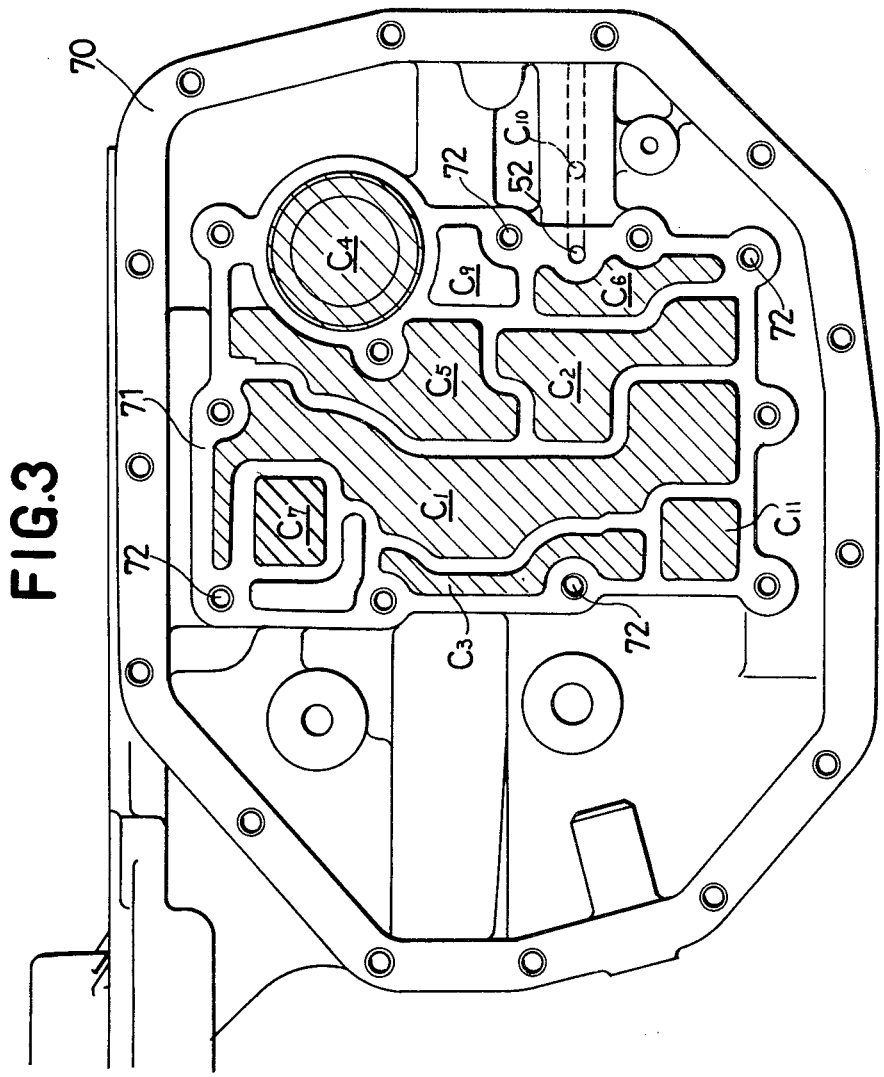
FIG. 3 is a front view of a flat wall surface of the transmission casing, with various conduits formed therein.
Figure 4:
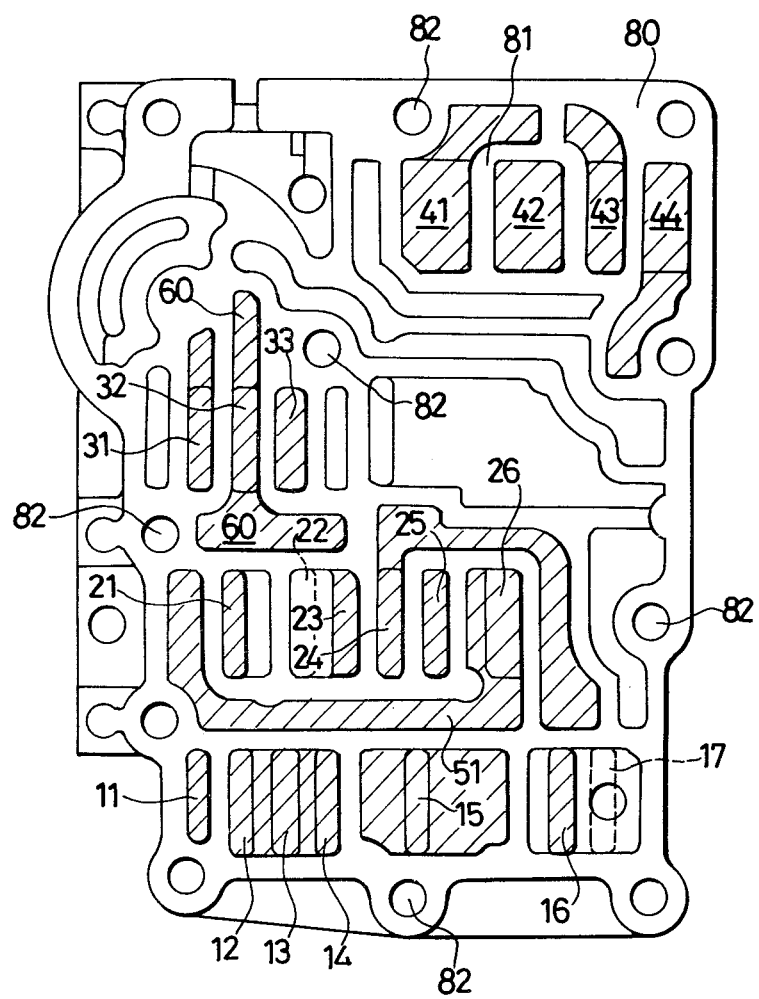
FIG. 4 is a front view of a flat wall surface of the valve casing, with ports of the respective valves formed therein.

Indicated at G of FIG. 2 is a control valve, including a spool 30 with two lands which is received along with a biasing spring 34 within a cylinder which is provided with inlet ports 32 and 33 and an outlet port 31 in a fluid passage parallel with the conduit 60 connected between the conduits $C_2$ and $C_4$. When the line pressure in the conduit $C_5$ is admitted through the inlet port 33, spool 30 is moved against the resilient force of the spring 34 to communicate the inlet port 32 with the outlet port 31, forming a fluid passage parallel with the passage 60. In FIGS. 3 and 4, the respective conduits and ports which are mentioned in the foregoing description are distinguished by hatching.

On part of the transmission gear mechanism, a casing is provided with conduits $C_5$, $C_7$ and $C_4$ which communicate respectively with the conduits $C_2$, $C_1$ and $C_2$, and with a return conduit $C_{11}$ to the pump A. These conduits, each in the form of a groove, are respectively cut into a flat wall surface 71 at one end of the transmission casing 70 as shown in FIG. 3. Conduit $C_{10}$ which communicates with the drain port 50 of the electromagnetic valve E is also independently formed in the flat wall surface, terminating at one end in an opening 52.

Figure 5:
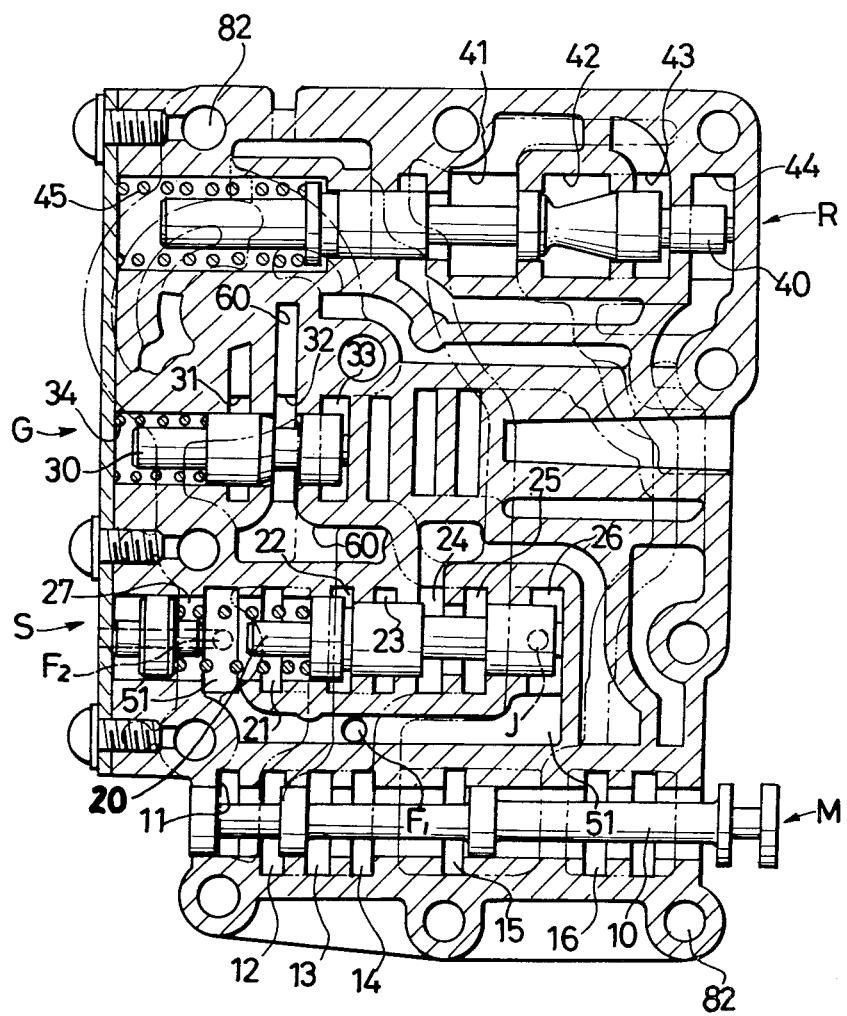
FIG. 5 is a front view of the flat wall surface of the valve casing with the spools of the respective valves.

On the other hand, the valve casing 80 which internally defines the cylinders for the pressure regulator valve R, manual valve M, shift valve S and control valve G has a flat wall surface 81 at one end thereof as shown particularly in FIG. 4. Independently cut into the flat wall surface 81 are the ports of the respective valves and grooves for the passages 51 and 60. As illustrated in FIG. 5, the spools 10, 20, 30 and 40 are fitted into the respective cylinders.

For assembling the valve casing 80 with the transmission casing 70, the flat wall surfaces 71 and 81 of the two casings are positioned face to face and a partition plate K is inserted between the opposing faces of the two flat wall surface. Thereafter, partition plate K is clamped fluid-tight between the valve and transmission casings 80 and 70 by threading bolts into tapped holes 72 in the casing 70 through bolt holes 82 in the valve casing 80 and apertures 85 in the partition plate K.

Figure 6:
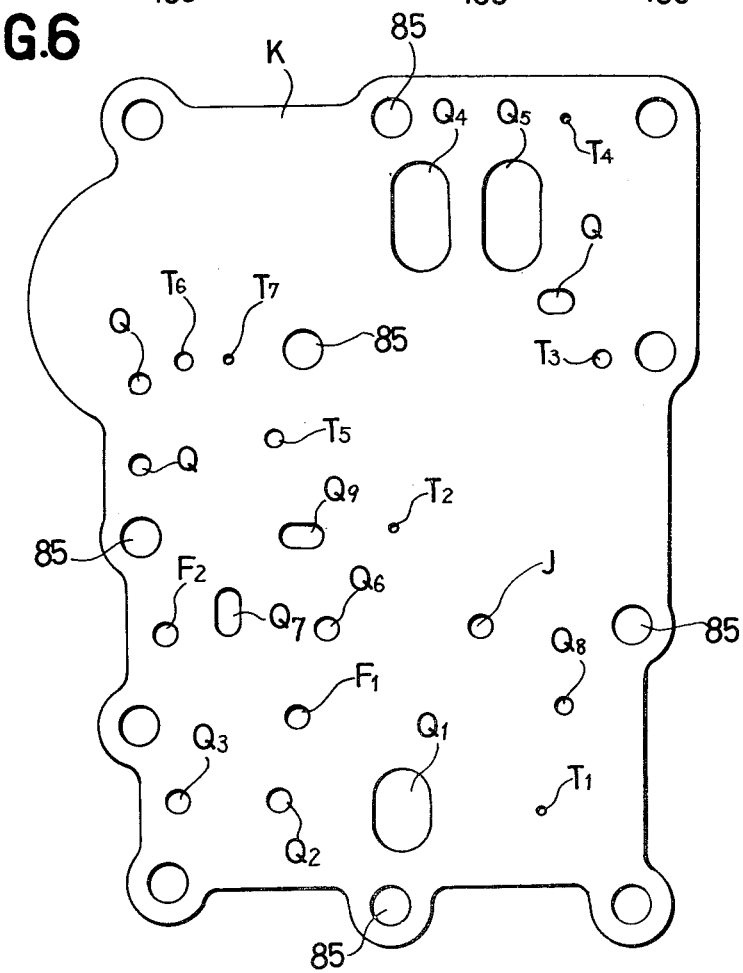
FIG. 6 is a front view of a partition plate.

As shown in FIG. 6, the partition plate K is provided with groups of required numbers of apertures Q and orifices T at the positions as depicted in FIG. 2, thereby communicating the conduits in the transmission casing 70 with the corresponding ports in the valve casing 80. To limit the description to what is directly relevant to the present invention, the first conduit $C_1$ communicates with the inlet port 15 of the manual valve M through aperture $Q_1$; the second conduit $C_6$ communicates with the first outlet port 11 of the manual valve M through aperture $Q_3$ and with the inlet port 21 of the shift valve S through aperture $Q_7$; the third conduit $C_2$ communicates with the second outlet ports 12, 13 and 14 of the manual valve M through aperture $Q_2$, with the inlet port 23 of the shift valve S through aperture $Q_6$ and with the passage 60 in the valve casing through aperture $Q_9$; the conduit $C_4$ communicates with the passage 60 through orifice $T_7$; and the conduit $C_5$ communicates with the outlet port 24 of the shift valve S through orifice $T_2$.

Aperture J which communicates the first conduit $C_1$ with the inlet port 26 of the shift valve S is provided only in a partition plate $K_1$ which is intended for a manual transmission according to the present invention. On the other hand, the orifice $F_2$ which communicates the conduit $C_{10}$ and the drain port 50 of the electromagnetic valve E still the conduit 51 and the inlet port 26 of the shift valve S as well as the orifice $F_1$ which communicates the third conduit $C_2$ with the inlet port 26 of the shift valve S are provided only in a partition plate $K_2$ which is intended for an automatic transmission according to the present invention.

Figure 7:
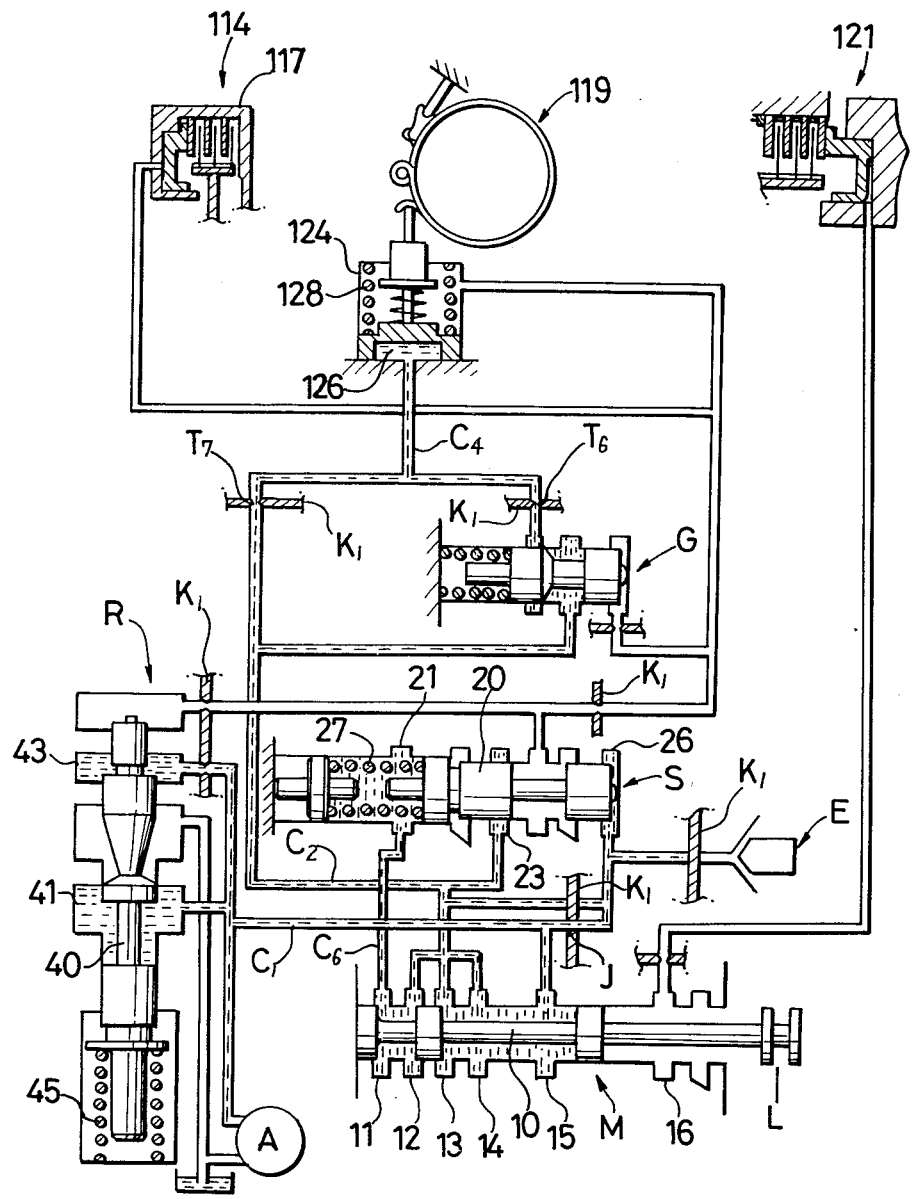
Figure 8:
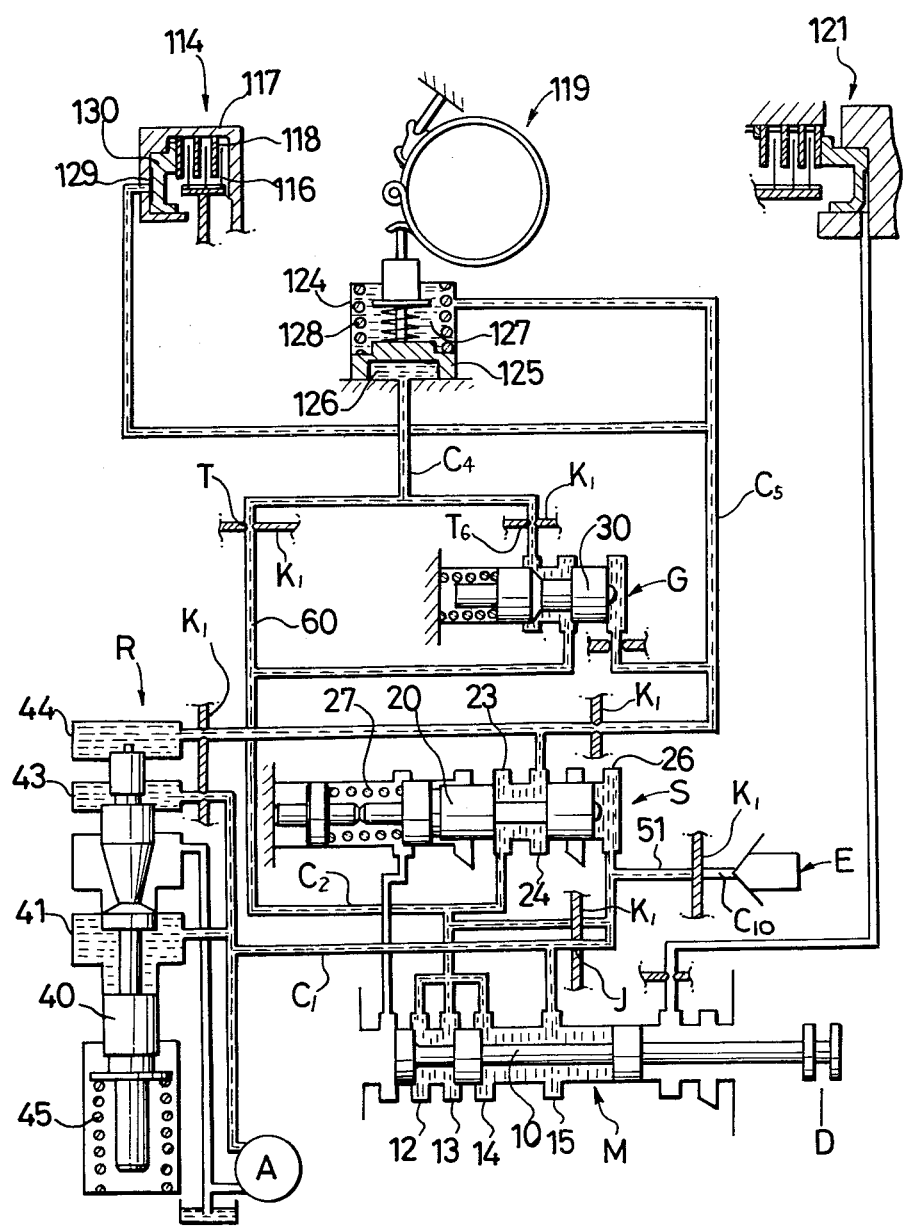

Now, the hydraulic control circuit which constitutes the manual transmission according to the present invention is explained with regard to the operations of low-speed range (L) of FIG. 7 and high speed range (H) of FIG. 8. The partition plate $K_1$ which is used for the manual transmission basically has the apertures $Q_1$, $Q_3$, $Q_7$, $Q_2$ $Q_6$ and $Q_9$ and orifices $T_7$ and $T_2$, along with the groups of apertures Q and orifices T of FIG. 2 and the aperture J. As a result, the inlet port 26 of the shift valve S is communicated with the first conduit $C_1$. As illustrated in FIG. 7, when the spool 10 of the manual valve is put in L-range position, the line pressure is thus admitted into the bottom pressure chamber through the inlet port 21 of the shift valve S to displace the spool of the shift valve S into the first position. The line pressure is thus supplied only to the actuating chamber 126 of the first brake 119, engaging the brake 119 while releasing the clutch 114 and the second brake 121 to establish a low speed gear train of a high reduction ratio through the transmission gear mechanism 102 as shown in the table.

If the spool 10 of the manual valve M is put into the D-range position (high speed range) as illustrated in FIG. 8, the line pressure in the bottom pressure chamber of the shift valve S is drained so that the spool 20 is shifted into the second position by the line pressure in the head pressure chamber acting against the action of the biasing spring 27, establishing an internal fluid pressure between the inlet and outlet ports 23 and 24 and applying the line pressure of conduit $C_2$ to the cylinder 129 of the clutch 114 through the conduit $C_5$ and at the same time to the relieving chamber 127 of the brake 119. As a result, clutch 114 is engaged and the brake 119 is released to establish a high speed gear train of a low reduction ratio through the transmission gear mechanism 102.

In this instance, since the conduit $C_{10}$ which communicates with the drain port 50 of the electromagentic valve E is blocked by the partition plate $K_1$, automatic shifts of the transmission gear mechanism 102 according to the vehicle speed, from a high-speed gear train to a low-speed gear train or vice versa, do not take place and the gear shift is effected manually through operation of the manual valve.

Figure 9:
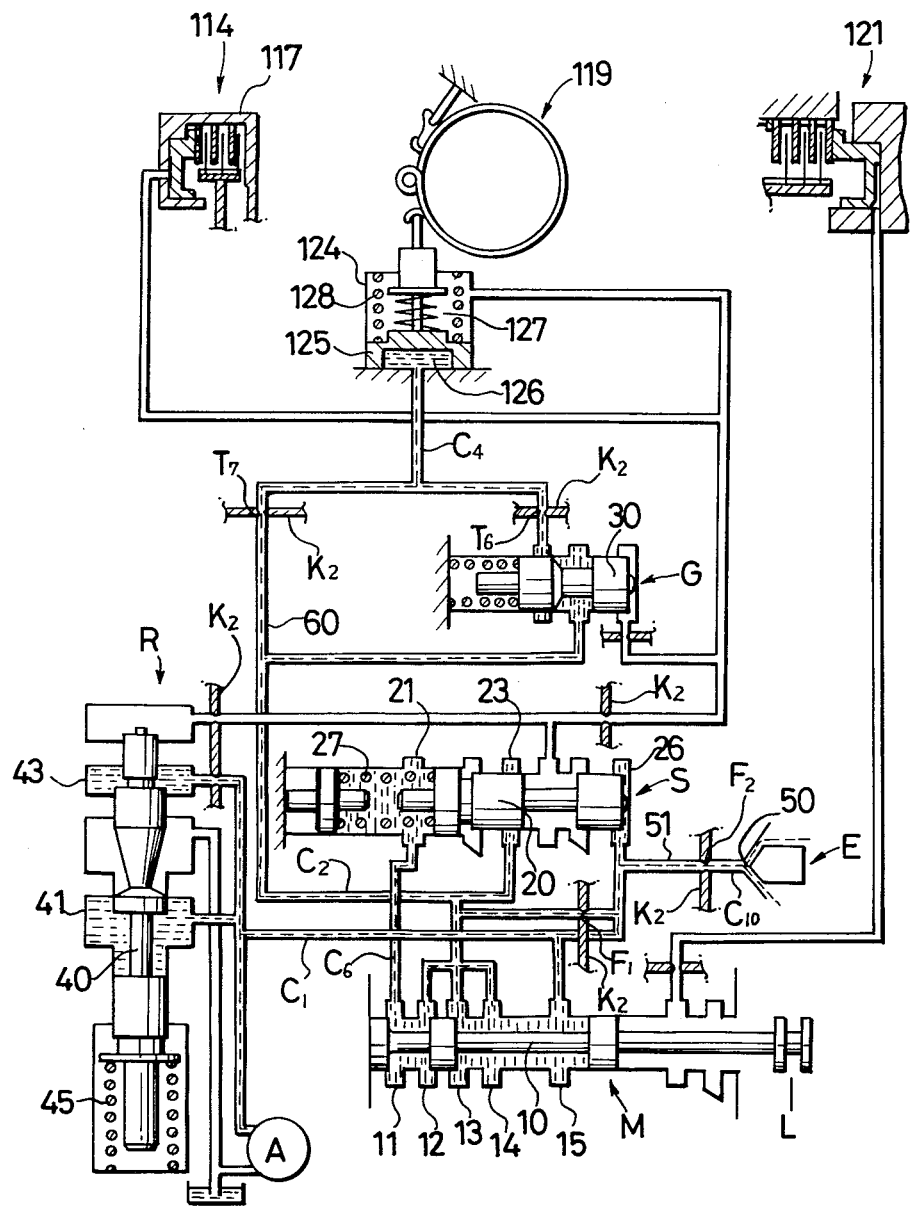
Figure 10:
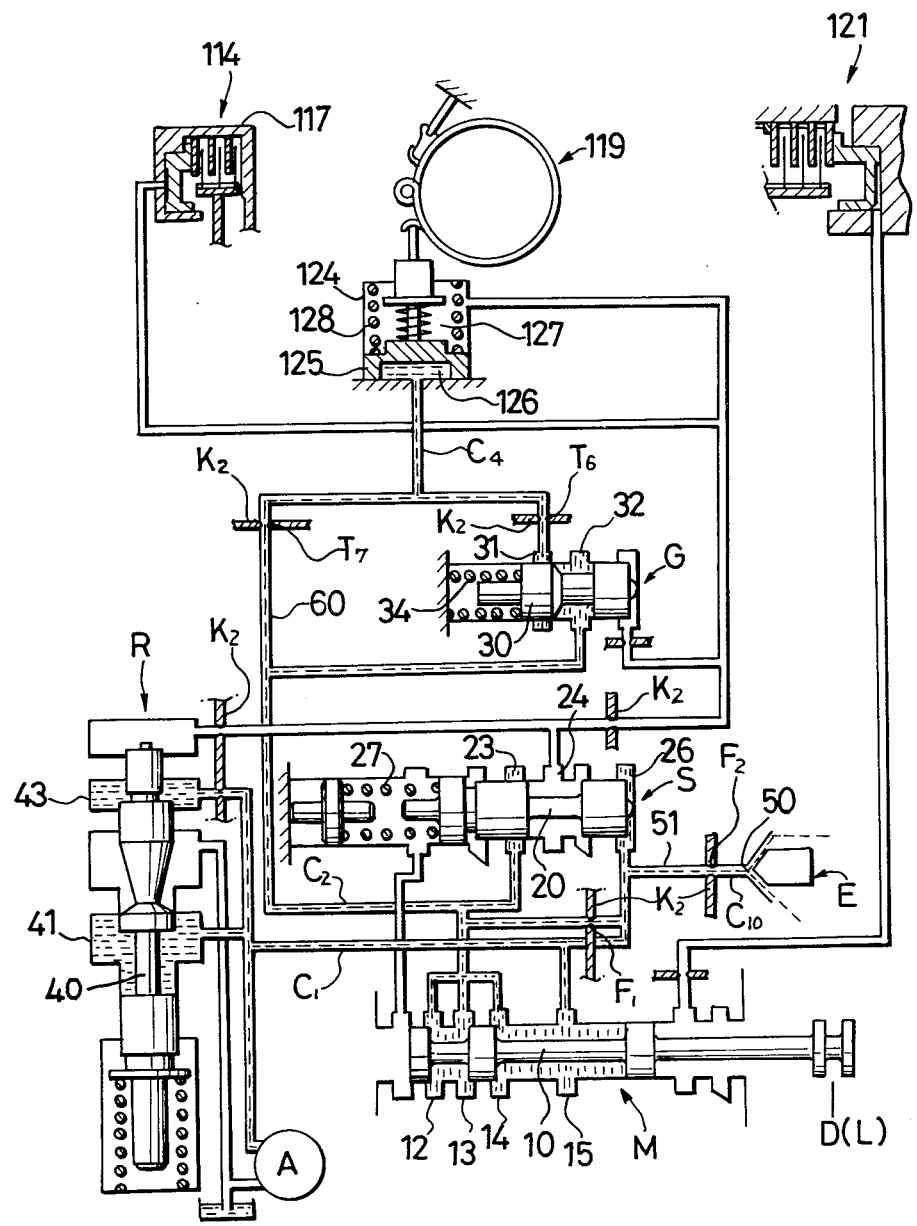
Figure 11:
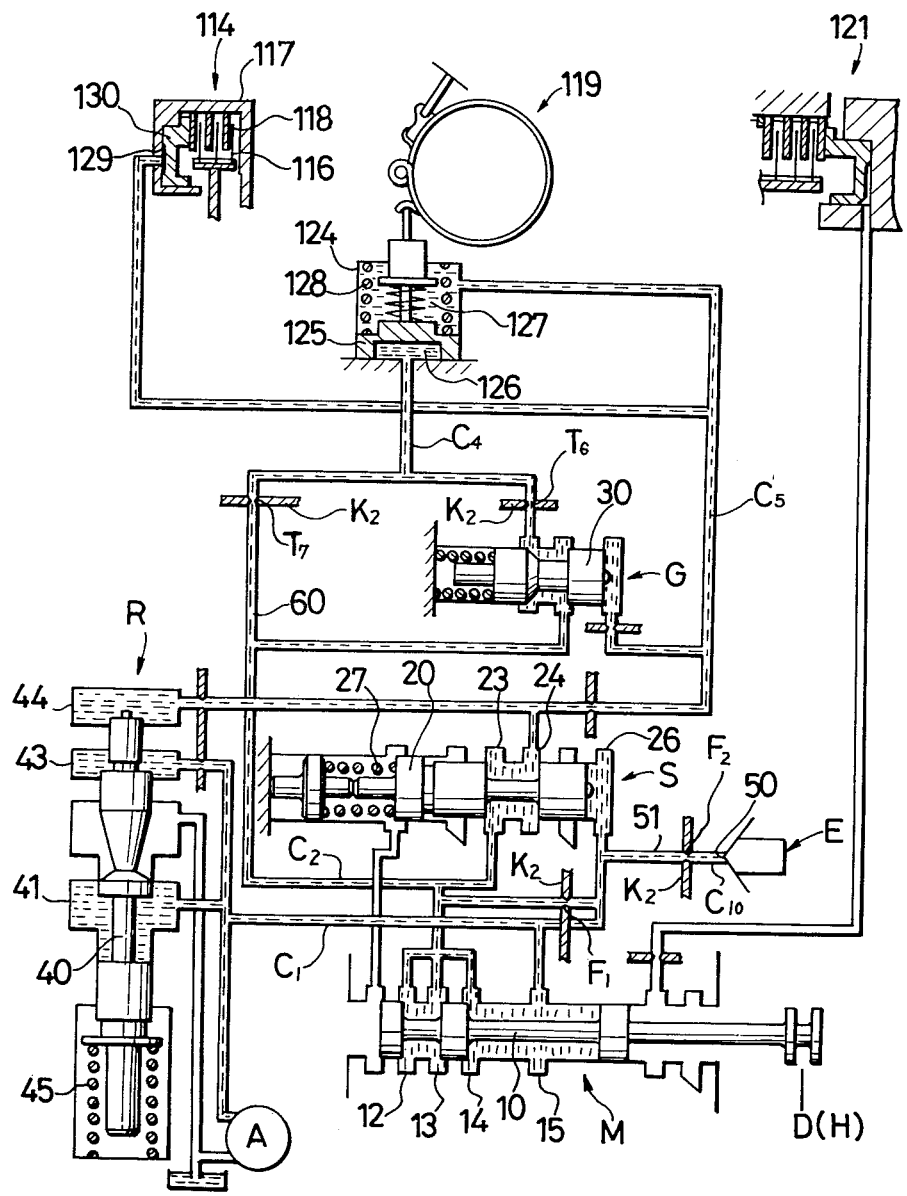

Now, the hydraulic control circuit which consitutes the automatic transmission according to the present invention is explained with regard to operations in low speed range (L) of FIG. 9, low-speed D-range (DL) of FIG. 10 and high-speed D-range (DH) of FIG. 11. The partition plate $K_2$ which is used for the automatic transmission basically has apertures $Q_1$, $Q_3$, $Q_7$, $Q_2$, $Q_6$ and $Q_9$ and orifices $T_7$ and $T_2$, and groups of apertures Q and orifices T of FIG. 2, along with orifices $F_1$ and $F_2$. In this case, the partition plate $K_2$ is not provided with the aperture J. As a result, the inlet port 26 of the head pressure chamber of the shift valve S is communicated with the third conduit $C_2$ through the orifice $F_1$, and the passage 51 which is in communication with the inlet port 26 is communicated through the orifice $F_2$ with the conduit $C_{10}$ leading to the drain port 50 of the electromagnetic valve E.

Upon placing the spool 10 of the manual valve M in L-range position, the line pressure is admitted through the inlet port 21 of the shift valve S to shift the spool 20 of the shift valve S into the first position, forming a low speed gear train of a high reduction ratio through the transmission gear mechanism 102 as in FIG. 7. The electromagnetic valve E is controlled by signals indicative of the vehicle speed in such a manner as to open the drain port 50 when the vehicle speed is lower than a predetermined value, and closing the drain port 50 at higher vehicle speeds. With the automatic transmission, the operating fluid of line pressure from the regulator valve R is not directly fed to the inlet port 26 of the shift valve S but instead the operating fluid of line pressure discharged through the outlet ports 12, 13, 14 of the manual valve M is fed to the inlet port 26 through the orifice $F_1$. Therefore, it is not drained through the drain port 50 of the electromagnetic valve E unless the manual valve is shifted to L-range or D-range position.

If the spool 10 of the manual valve M is shifted to D-range position, the operating fluid of line pressure is supplied through the third conduit $C_2$ to the inlet port 23 of the shift valve S and the inlet port 26 of the head pressure chamber. However, since the electromagnetic valve E holds the drain port 50 in an open state at vehicle speeds below a predetermined value, the operating fluid in the head pressure chamber is drained through the drain port 50 via passage 51, orifice $F_2$ and conduit $C_{10}$, and the spool 20 of the shift valve S is shifted to the first position as shown in FIG. 10 by the action of the spring 27, closing the internal fluid passage across the valve to block the flow of line pressure from the inlet port 23 to the outlet port 24. The line pressure in the third conduit $C_2$ is thus supplied only to the actuating chamber 126 of the brake 119, engaging the brake 119 to form a low speed gear train of a high reduction ratio through the transmission gear mechanism 102. Under these circumstances, if the vehicle speed exceeds the predetermined value, the electromagnetic valve E closes the drain port 50 in response to a vehicle speed signal to stop the draining through the drain port 50. Consequently, the head pressure chamber of the shift valve S is acted upon by the line pressure, displacing the spool 20 into the second position as shown in FIG. 11 against the action of the spring 27. Whereupon, the internal fluid passage is formed across the valve, permitting the operating fluid to flow from the inlet port 23 to the outlet port 24. The operating fluid in the conduit $C_2$ is fed to the conduit $C_5$ to fill the cylinder 129 of the clutch 114 and the relieving chamber 127 of the brake 119 with the line pressure. As the same pressure exists in the pressure chambers 126 and 127 on opposite sides of the piston 125 in the cylinder 124 of the brake 119, the piston 125 is returned by the action of the spring 128 to release the brake 119. Since the clutch 114 is in an engaged state, a high-speed gear train of a low reduction ratio is formed across the transmission gear mechanism 102.

The gear shift from D-range/low-speed (DL) to D-range/high-speed (DH) is automatically effected by energization and de-energization of the electromagnetic valve E which is controlled according to the vehicle speed, without requiring manual efforts on the manual valve M. On the contrary, if the vehicle speed drops below the predetermined value during operation in D-range/high-speed (DH), the electromagnetic valve E opens the drain port 50 to drain and lower the pressure in the head pressure chamber of the shift valve S through the passage 51, automatically changing into the state of FIG. 10 from that of FIG. 11. Inlet port 26 communicates with the conduit $C_2$ through the orifice $F_1$ and with the conduit $C_{10}$ through the orifice $F_2$, so that draining of the inlet port 26 through the drain port 50 imposes no significant influence on the pressure within the conduit $C_2$.

In the foregoing hydraulic control circuit, the spool 10 of the manual valve M when in reverse (R) position communicates the inlet port 15 with the outlet port 16, applying the line pressure in the first conduit $C_1$ to the second brake 121 through the conduit $C_7$. When the spool 10 of the manual valve M is in parking (P) or neutral (N) position, the line pressure which is generated during operation of the pump A is applied only to the inlet port 26 of the shift valve S. Therefore, in the case of the automatic transmission, the line pressure which occurs during operation of the pump A prevails only in the conduit $C_1$ and at the inlet port 15 of the manual valve.

As clear from the foregoing description, the present invention provides a transmission for vehicles including: a torque converter; a planetary gear system; a planetary gear control mechanism having at least a brake and a clutch; a hydraulic control circuit including a manual valve with at least a low-speed range and a high-speed range positions and a shift valve having a spring-biased spool with a first position in which the biasing spring is in stretched state to let the spool block an internal fluid passage of the valve and a second position in which the biasing spring is compressed to let the spool form the internal fluid passage; a valve casing internally defining a pressure regulator valve, and having formed therein inlet ports of the respective valves along with conduits therefor; a transmission casing having formed therein a first conduit $C_1$ for conducting operating fluid of regulated line pressure from the pressure regulator valve, a second conduit $C_6$ for communicating a first outlet port of the manual valve with a bottom pressure chamber of the shift valve which urges the spool of the shift valve to the first position, and a third conduit $C_2$ provided for communication with a second outlet port of the manual valve for distributing the operating fluid of line pressure to hydraulic servo motors of the planetary control mechanism; the transmission being capable of constituting either a manual transmission or an automatic transmission simply by assembling the valve and transmission casings and adding slight alterations in the fluid communications between the aforementioned conduits and ports of the respective valves.

More particularly, in order to constitute a manual transmission, the first conduit $C_1$ conducting the operating fluid of line pressure is communicated with a port 26 of a head pressure chamber which urges the spool 20 of the shift valves to the second position; the first outlet port 11 of the manual valve is communicated through the second conduit $C_6$ with a port 21 of a bottom pressure chamber which urges the spool of the shift valve to the first position; and the second outlet ports 12, 13 and 14 of the manual valve are communicated through the third conduit $C_2$ with the inlet port 23 to the internal fluid passage of the shift valves. With this arrangement, there is obtained a manual transmission for a vehicle, which can be shifted to forward low-speed (range) or forward high speed (D- or H-range) only by manual efforts on the manual valve, forming a low-speed gear train of a high reduction ratio when the line pressure is applied to the pressure chamber which urges the spool of the shift valve to the first position and forming a high-speed gear train of a low reduction ratio when the line pressure is applied to the pressure chamber which urges the spool of the shift valve to the second position.

In order to constitute an automatic transmission, the foregoing arrangement is altered only in that the port 26 to the head pressure chamber which urges the spool of the shift valve to the second position is communicated through an orifice $F_1$ with the third conduit $C_2$ instead of the first conduit $C_1$ and the port 26 of the head pressure chamber is communicated through an orifice $F_2$ with a drain port 50 of an electromagnetic valve E which is controlled by signals indicative of the vehicle speed to open the drain port when the vehicle speed is lower than a predetermined value and to close same at higher vehicle speeds. In this case, if the manual valve is manipulated into forward high-speed range (D-range), the line pressure is applied to the head pressure chamber of the shift valve to shift its spool into the second position when the vehicle speed is higher than the predetermined value, thereby establishing an internal fluid passage across the shift valve to form a high-speed gear train of a low reduction ratio. Under these circumstances, if the vehicle speed drops below the predetermined value, the electromagnetic valve uncovers the drain port to drain therethrough the operating fluid in the head pressure chamber, whereupon the spool of the shift valve is returned to the first position by the action of the biasing spring, blocking its internal fluid passage to form a low-speed gear train of a high reduction ratio. Thus, the gear shifts take place automatically.

Further, according to the present invention, for constituting a manual or automatic transmission, a flat wall surface is provided on the casing of the transmission, forming thereon the conduits $C_1$, $C_6$ and $C_2$ in the form of discrete open grooves, along with a conduit $C_{10}$ for communication with the drain port which is controlled by the electromagnetic valve. On the other hand, a flat wall surface is also provided on the valve casing in face to face relation with the flat wall surface of the transmission casing, forming thereon discrete open grooves to serve as ports of the pressure regulator valve, manual valve and shift valve. A partition plate is fluid-tightly clamped between the opposing flat walls of the valve and transmission casings, a first kind of partition plate being provided with: an aperture $Q_1$ to communicate the conduit $C_1$ on the transmission casing with the inlet port 15 of the manual valve on the valve casing; apertures $Q_3$ and $Q_7$ to communicate the conduit $C_6$ on the transmission casing respectively with an outlet port 11 of the manual valve on the valve casing and a port 21 of the bottom pressure chamber which urges the spool of the shift valve into the first position; apertures $Q_2$ and $Q_6$ to communicate the conduit $C_2$ on the transmission casing respectively with outlet ports 12, 13, 14 of the manual valve on the valve casing and an inlet port 23 of the internal fluid passage to be opened and closed by the spool of the shift valve; and an aperture J to communicate the conduit $C_1$ on the transmission casing with an inlet port 26 to the head pressure chamber which urges the spool of the shift valve into the second position. There is also provided a second kind of partition plate which is provided, in addition to the aforementioned apertures $Q_1$, $Q_3$, $Q_7$, $Q_2$ and $Q_6$, with an orifice $F_1$ to communicate the conduit $C_2$ on the transmission casing with the inlet port 26 of the head pressure chamber which urges the spool of the shift valve into the second position, and an orifice $F_2$ to communicate a conduit $C_{10}$ leading to a drain port 50 which is provided in the transmission casing in association with the electromagnetic valve with a port 26 of the head pressure chamber which urges the spool of the shift valve to the second position. The first partition plate, when clamped between the flat wall surfaces of the valve and transmission casings, constitutes a manual transmission, while the second partition plate clamped between the two flat wall surfaces constitutes an automatic transmission. Therefore, it is possible to fabricate manual and automatic transmissions extremely easily from the same valve and transmission casings simply by changing the partition plate. Since the valve and transmission casings are useful for both manual and automatic transmissions, it is only the conduit $C_{10}$ and drain port 50 which are formed on the transmission casing in association with electromagnetic valve that are unnecessary for the manual transmission. The present invention thus provides a transmission construction of great utility without incurring any substantial increases in cost.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transmission for vehicles, including a pressure regulator valve supplying an operating fluid of a line pressure, a torque converter, a planetary gear system, a control mechanism including at least a brake and a clutch for controlling said planetary gear system, and a hydraulic control circuit including a manual valve with at least valve positions for low- and high-speed ranges, and a shift valve forming a first and second pressure chamber with a spring-biased spool having a first position in which a biasing spring for biasing said spool is stretched to let the spool close an internal fluid passage of the shift valve and a second position in which the biasing spring is compressed to let the spool open the internal fluid passage, said transmission further comprising:

a first conduit for conducting said operating fluid of said line pressure regulated by said pressure regulator valve, being communicated with an inlet port of said manual valve and an inlet port of said first pressure chamber which urges the spool of said shift valve into said second position;

a second conduit communicating a first outlet port of said manual valve with an inlet port of the second pressure chamber which urges the spool of said shift valve into said first position; and a third conduit communicating second outlet ports of said manual valve with an inlet port of said internal fluid passage of said shift valve;

said first and second outlet ports being communicated with said inlet port of said second pressure chamber and said inlet port of said internal fluid passage, respectively, when said manual valve is put in low-speed range position, with the operating fluid in said first conduit communicated to the second pressure chamber of said shift valve to hold the spool thereof in said first position and to engage the brake of said control mechanism through said first conduit to form a gear train of a high reduction ratio across said planetary gear system;

said first outlet port being closed when said manual valve is put in high-speed range position, thereby communicating said second outlet ports with said inlet port of said internal flow passage to distribute the operating fluid through said internal passage of said shift valve in said second position under the influence of the fluid pressure in said first conduit and through said third conduit to disengage the brake and engage the clutch of said control mechanism, forming a gear train of a low reduction ratio across said planetary gear system.

2. A transmission for vehicles, including a pressure regulator valve supplying an operating fluid of a line pressure, a torque converter, a planetary gear system, a planetary gear control mechanism including at least a brake and a clutch, a hydraulic control circuit for controlling said planetary gear system and including a manual valve with at least valve positions for low- and high-speed ranges, a shift valve forming a first and second pressure chamber, with a spring-biased spool movable between a first position in which a biasing spring for biasing said spool is stretched to let the spool close an internal fluid passage of the shift valve and a second position in which the biasing spring is compressed to let the spool open the internal fluid passage, and an electromagnetic valve adapted to open a drain port when a vehicle speed is lower than a predetermined value and to close the drain port at vehicle speeds higher than said predetermined value, said transmission further comprising:

a first conduit for conducting said operating fluid of said line pressure regulated by said pressure regulator valve, being communicated with an inlet port of said manual valve;

a second conduit communicating a first outlet port of said manual valve with an inlet port of said second pressure chamber which urges the spool of said shift valve to said first position;

a third conduit communicating second outlet ports of said manual valve with an inlet port of said internal fluid passage of said shift valve and with an inlet port of said first pressure chamber which urges the spool of said shift valve to said second position; and orifice means communicating said drain port under on-off control of said electromagnetic valve with said inlet port of said first pressure chamber which urges the spool of said shift valve to said first position;

said first and second outlet ports of said manual valve being communicated with said inlet port of said second pressure chamber and said inlet port of said first pressure chamber, respectively, of said shift valve when said manual valve is put in low-speed range position, thereby distributing the operating fluid in said first conduit to the first and second pressure chambers of said shift valve to hold the spool thereof in said first position and to engage the brake of said control mechanism through said third conduit to form a gear train of a high reduction ratio across said planetary gear system;

said first outlet port being closed when the spool of said manual valve it put in high-speed range position, while communicating said second outlet ports with said inlet port of said internal fluid passage of said shift valve and said inlet port of said first pressure chamber and draining through the orifice means the operating fluid supplied from said first conduit and acting on the spool of said shift valve at vehicle speeds below said predetermined value at which speeds said drain port is opened by said electromagnetic valve thereby holding said spool of said shift valve in said first position to engage the brake to form a gear train of a high reduction ratio across the planetary gear system and applying the operating fluid in said first conduit to said first pressure chamber which urges the spool of said shift valve to said second position at vehicle speeds higher than said predetermined value so that said drain port is closed by said electromagnetic valve, thereby distributing the operating fluid in said third conduit to disengage the brake and engage the clutch of said control mechanism to form a gear train of a low reduction ratio across said planetary gear system.

3. A transmission for vehicles having a torque converter, a regulator valve supplying an operating fluid of a line pressure, a planetary gear system, a planetary gear control mechanism having at least a brake and a clutch, and a hydraulic control circuit including a manual valve with at least valve positions for low- and high-speed ranges and a shift valve formed with a first and second pressure chamber with a spring-biased spool movable between a first position in which a biasing spring for biasing said spool is stretched to let the spool close an internal fluid passage of the shift valve and a second position in which the biasing spring is compressed to let the spool open the internal fluid passage, the spool of said shift valve being held in said first position when said manual valve is in low-speed range position thereby forming a gear train of a high reduction ratio across said planetary gear system, and the spool of said shift valve being held in said second position when said manual valve is in high-speed range position thereby forming a gear train of a low reduction ratio across said planetary gear system, said transmission further comprising:

a flat wall surface provided on a casing of said transmission and formed with a plurality conduits in the form of open grooves, including a first conduit for conducting said operating fluid of said line pressure supplied from said regulator valve, a second conduit for conducting the operating fluid from a first outlet port of said manual valve to said second pressure chamber which urges the spool of said shift valve to said first position, a third conduit for conducting the operating fluid from second outlet ports of said manual valve to said first pressure chamber which urges the spool of said shift valve to said second position and to said internal fluid passage of said shift valve, and a fourth conduit communicating with a drain port associated with an electromagnetic valve;

a valve casing movably accomodating spools of said regulator valve, said manual valve and said shift valve within respective cylinders and having a flat wall surface formed with, in the form of discrete open grooves, an inlet port for said manual valve, a first outlet port and second outlet ports of said manual valve, an inlet port of said second pressure chamber which urges the spool of said shift valve to said first position, an inlet port of the internal fluid passage of said shift valve and an inlet port of said first pressure chamber which urges the spool of said shift valve to said second position;

a first and second partition plate;

said flat wall surfaces of said transmission and valve casings being faced in parallel relation with each other and constituting a manual transmission when clamped to each other through said first partition plate having first and second apertures to communicate said first conduit respectively with said inlet port of said manual valve and said inlet port of the first pressure chamber which urges the spool of said shift valve to said second position, third and fourth apertures to communicate said second conduit respectively with said first outlet port of said manual valve and said inlet port of said second pressure chamber which urges the spool of said shift valve to said first position, and fifth and sixth apertures to communicate said third conduit respectively with said second outlet ports of said manual valve and the inlet port of said internal fluid passage of said shift valve;

said flat wall surfaces of said transmission and valve casings being faced in parallel relation with each other and constituting an automatic transmission when clamped to each other through said second partition plate having a first aperture to communicate said first conduit with said inlet port of said manual valve, third and fourth apertures to communicate said second conduit respectively with said first outlet port of said manual valve and the inlet port of said second pressure chamber which urges the spool of said shift valve to said first position, fifth and sixth apertures and a first orifice to communicate said third conduit respectively with said second outlet ports of said manual valve, the inlet port of said internal fluid passage of said shift valve and said inlet port of said first pressure chamber which urges the spool of said shift valve to said second position, and a second orifice to communicate the fourth conduit leading to a drain port in association with said electromagnetic valve with said inlet port of said first pressure chamber which urges the spool of said shift valve to said first position.

* * * * *